United States Patent [19]

Fukuda et al.

[11] Patent Number: 5,265,215
[45] Date of Patent: Nov. 23, 1993

[54] MULTIPROCESSOR SYSTEM AND INTERRUPT ARBITER THEREOF

[75] Inventors: Munehiro Fukuda, Sagamihara; Nobuyuki Ooba, Kawasaki; Takeo Nakada, Kawaguchi, all of Japan

[73] Assignee: International Business Machines Corporation, Armonk, N.Y.

[21] Appl. No.: 870,014

[22] Filed: Apr. 17, 1992

[30] Foreign Application Priority Data

Apr. 22, 1991 [JP] Japan .................. 3-116694

[51] Int. Cl.⁵ .................. G06F 9/46; G06F 13/36; G06F 15/16
[52] U.S. Cl. .................. 395/325; 395/725; 340/825.5; 370/85.2; 364/241.2; 364/241.4; 364/242.6; 364/242.8; 364/240; 364/240.1; 364/241.5; 364/DIG. 1
[58] Field of Search .............. 395/725, 325, 275, 650; 340/825.51, 825.5; 370/85.1, 85.2

[56] References Cited

U.S. PATENT DOCUMENTS

| | | | |
|---|---|---|---|
| 3,925,766 | 12/1975 | Bardotti et al. | 395/725 |
| 4,159,518 | 6/1979 | Draper et al. | 364/200 |
| 4,268,904 | 5/1981 | Suzuki et al. | 364/200 |
| 4,271,468 | 6/1981 | Christensen et al. | 364/200 |
| 4,302,808 | 11/1981 | Zanchi et al. | 364/200 |
| 4,314,335 | 2/1982 | Pezzi | 395/725 |
| 4,495,569 | 1/1985 | Kagawa | 364/200 |
| 4,633,394 | 12/1986 | Georgion et al. | 364/200 |
| 4,769,768 | 9/1988 | Bomba et al. | 395/725 |
| 4,787,033 | 11/1988 | Bomba et al. | 395/325 |
| 4,816,990 | 3/1989 | Williams | 364/200 |
| 4,985,831 | 1/1991 | Dulong et al. | 364/200 |
| 5,016,162 | 5/1991 | Epstein et al. | 395/775 |
| 5,070,447 | 12/1991 | Koyama | 395/725 |
| 5,125,093 | 6/1992 | McFarland | 395/725 |
| 5,210,871 | 5/1993 | Lala et al. | 395/650 |

*Primary Examiner*—Gopal C. Ray
*Attorney, Agent, or Firm*—Bernard M. Goldman; Richard M. Ludwin

[57] ABSTRACT

In a tightly coupled multiprocessor system, I/O interrupts are distributed to respective processors in accordance with load conditions of the processors without partiality to any one processor. Interrupt arbitration circuits provided in respective processors receive an interrupt request from an I/O device, effect interrupt arbitration using a parameter indicating the load condition of each processor as a first interrupt priority. If the arbitration fails to determine a sole processor, additional arbitration finally selects a sole processor P on the basis of the second interrupt priority which is varied circularly.

1 Claim, 3 Drawing Sheets

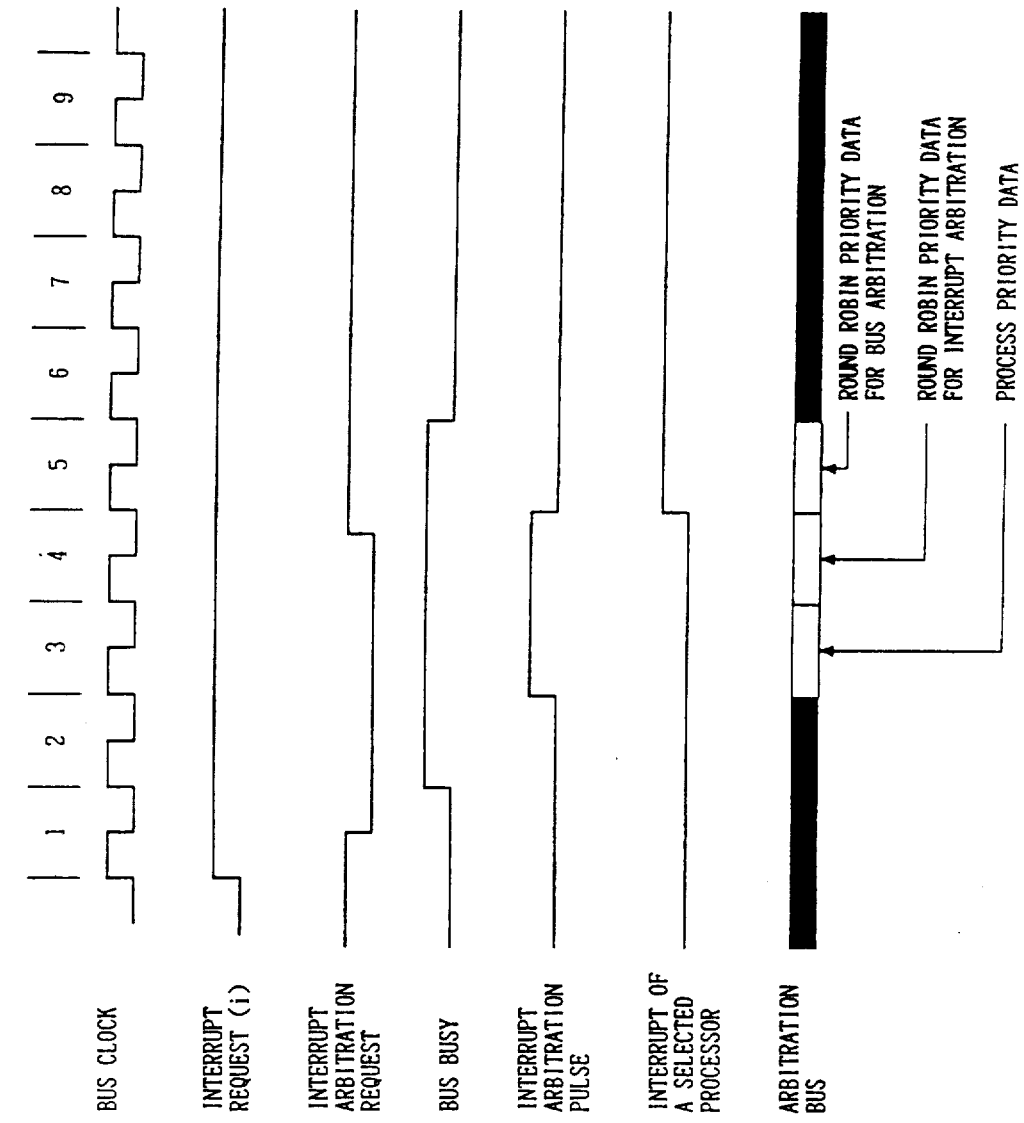

MULTIPROCESSOR SYSTEM AND INTERRUPT ARBITER THEREOF

BACKGROUND OF THE INVENTION

1. Field of the Invention

This invention relates to a tightly coupled multiprocessor system and, more particularly, to a system which can distribute I/O interrupts to processors according to load conditions of the processors without converging them to one of the processors.

Recent improvements in hardware techniques have promoted practical use of a tightly coupled multiprocessor workstation having a number of processors. It is desirable that a workstation of this type provides various flexible I/O functions in addition to a high-speed arithmetical computing function.

Most conventional systems have a configuration in which each I/O device is locally connected to each processor or an alternative configuration in which a specific processor has a centralized control over I/O devices (for example, JA PUPA 63-147252). These systems are based on such a premise that each I/O is controlled by a particular processor. Therefore, although they are readily realized, load distribution of I/O processing is almost impossible, and it is difficult efficiently to present users high-level I/O functions.

On the other hand, such an expedient is explored that load distribution of I/O processing is performed on a tightly coupled multiprocessor system. In order to realize load distribution of I/O processing, it is essential that all processors in the system can operate the I/O devices equally and directly. In particular, it is necessary to realize the function of distributing interrupts from the I/O devices to the processors. For distribution of interrupts, however, the arbitration of an interrupt is necessary so that two or more processors do not accept a single interrupt concurrently. Unless the interrupt arbitration is realized, a request from a single I/O device will be processed redundantly. It is also important for realization of I/O load distribution that an interrupt be transmitted to a processor that currently executes a least-loaded job or a low priority job.

Systems effecting load distribution of I/O processing are disclosed in "The Design and Development of a Very High Speed System Bus—The Encore Multimax Nanobus", D.J. Schanin, Proceedings of Fall Joint Computer Conference, pp. 410–418, November 1986, and in "Balance: A Shared Memory Multiprocessor System", S.S. Thakkar, P. Gifford, G. Fielland, Proceedings of 2nd International Conference on Supercomputing, pp. 93–101, May 1987.

These two systems are equipped with a function for arbitrating interrupts. These two systems effect interrupt arbitration by using, as a index, the priority of a process currently executed by each processor or the number of pending interrupts existing in the interruption queue and then achieves I/O load distribution. However, there still remains a possibility that two or more processors win the arbitration. In this case, one of the processors that should accept the interrupt is finally selected by means of a specific slot number of the processor.

These two expedients for interrupt arbitration, however, cannot realize satisfactory I/O load distribution because interrupts are always sent to a processor determined by the slot number indicating the physical location thereof if all processors are executing processes in the same priority level. In addition, when interrupt queues of all processors are empty, interrupts are always sent to a specific processor even if it currently executes an important job. Further, it is absolutely impossible, or possible only upon start of the system, to designate a group of processors that accept interrupts in each interrupt level. Therefore, these systems cannot dynamically designate or change a group of processors that accept interrupts during operation of the system according to the load conditions of the processors.

Further, no existing system is equipped with hardware for control of interrupt arbitration only in processors. Existing systems add control logic circuitry not only to processors but also to I/O devices, or alternatively, newly provide a specific I/O device with communication lines added to the system for interrupt arbitration. Therefore, the scale of the control hardware for realizing interrupt arbitration cannot be disregarded. There are various methods for realizing arbitration such as repeated message communication, an asynchronous back-off method, but it is not expected that they arbitrate interrupts and transmit the result to a processor in a short time.

Other prior art techniques related to the present invention are JA PUPA 61-87448, JA PUPA 62-187955, and JA PUPA 1-279354. JA PUPA 61-87448 discloses changing priorities for bus arbitration every time when bus arbitration is carried out. JA PUPA 62-187955 discloses changing priorities for bus arbitration cyclically every time when bus arbitration is carried out. JA PUPA 1-279354 discloses changing priorities for bus arbitration cyclically every time when bus arbitration is carried out, and setting upper and lower limits for each processor, and further changing the priority of each processor between the upper and lower limits. In this case, if the upper and lower limits of a given processor are set equal, its priority can be fixed at the value. All these prior art techniques, however, are directed to arbitration of bus requests, and does not teach either distributing a load by interruption in first arbitration or eliminating convergency of interrupts in additional second arbitration.

SUMMARY OF THE INVENTION

This invention has been done in view of the aforementioned circumstances, and has an object to provide such an I/O interruption technique for a multiprocessor system capable of distributing I/O interrupts to the processors according to load conditions of the processors without converging them to one of the processors.

Another object of the invention is to make the control of the I/O interruption easily applicable to existing multiprocessor systems.

In order to attain the foregoing objects, a system according to the invention performs I/O interrupt arbitration by using indices indicating load conditions of processors as first priorities. If the arbitration cannot select one of the processors, the system finally selects one of the processors according to second priorities that vary cyclically.

In addition, the invention uses a bus arbiter originally provided for arbitrating bus requests from processors, also for I/O interrupt to facilitate its availabilty to existing multiprocessor systems. Specifically, in many conventional tightly coupled multiprocessor systems, bus arbiters provided in respective processors communicate with each other via an arbitration line and arbitrate requests from processors for the use of the bus. The invention can be implemented in quite an easy manner by using the arbitration line also for arbitration of interrupts and by providing an additional circuit for interrupt arbitration in each processor. This circuit is made by adding some registers and comparators to the logic of a conventional interrupt controller. Hereafter, the circuit is called an interrupt arbiter for distinction from a bus arbiter.

BRIEF DESCRIPTION OF THE DRAWING

FIG. 3 is a timing chart for explanation of operation of the interrupt arbiters shown in FIG. 2.

DETAILED DESCRIPTION OF A PREFERRED EMBODIMENT OF THE INVENTION

Figure 1:
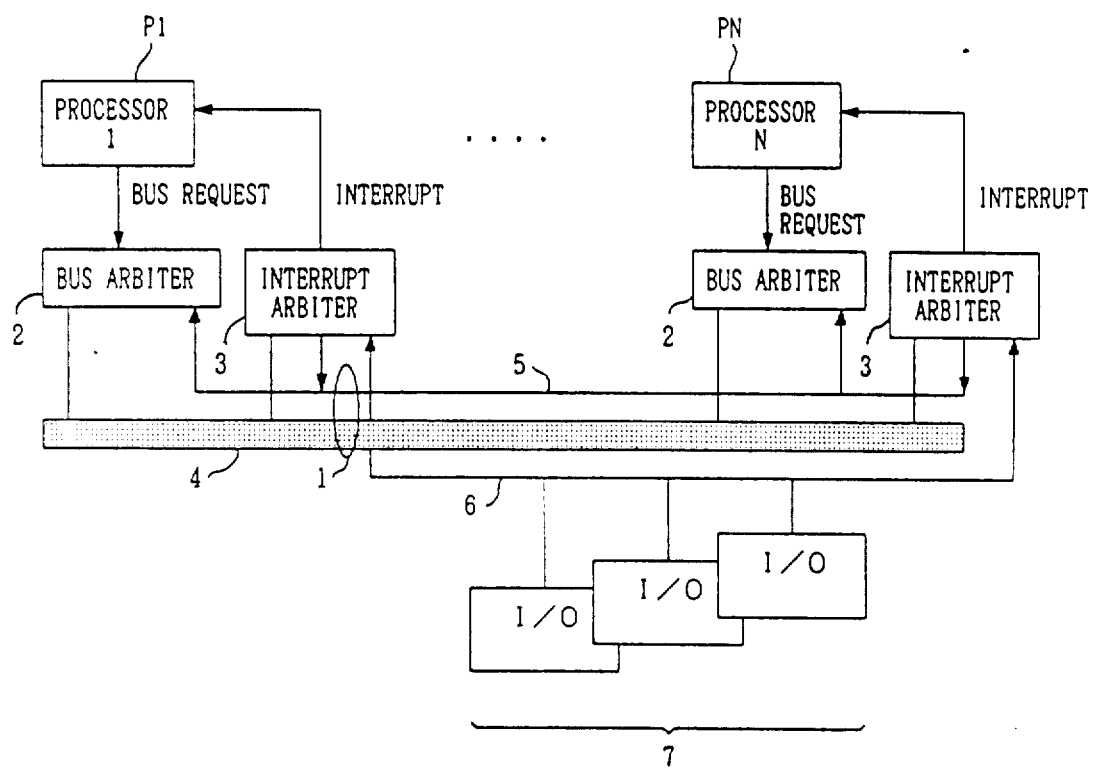
FIG. 1 is a block diagram showing a preferred embodiment of the invention.

A preferred embodiment of the invention is explained below with reference to the drawing.

FIG. 1 shows the whole configuration of an interrupt arbitration mechanism of a multiprocessor system to which the invention is applied. In FIG. 1, processors P1 to PN are commonly coupled to a shared bus 1 (a data bus, address bus, and control bus are not shown in the FIGURE). Each processor P (indicated without its suffix unless specific indication of a particular processor is needed) includes a bus arbiter 2 and an interrupt arbiter 3. The bus arbiter 2 arbitrates bus requests from processors P, and the interrupt arbiter 3 arbitrates an I/O interrupt request. Both the bus arbiters 2 and the interrupt arbiters 3 are commonly coupled to an arbitration line 4 and to an interrupt arbitration request line 5. The interrupt arbiters 3 are also coupled commonly to an interrupt request line 6 to which I/O devices 7 are connected.

Each interrupt arbiter 3 receives an interrupt request directly from the I/O device 7 through the interrupt request line 6. When an interrupt request is issued from the I/O device 7, each interrupt arbiter 3 pulls down the interrupt arbitration request line 5 to LOW, and prohibits the use of the arbitration line 4 by the bus arbiter 2 for a while. The interrupt arbitration request line 5 is a wired-OR, active-LOW signal line. When a preceding memory bus cycle ends, the interrupt arbiters 3 communicate with each other through the arbiter line 4 and operate the arbitration for an interrupt.

Interrupt arbitration is carried out first by using the priority of a process currently executed by each processor P, as explained with reference to FIG. 2. The priority of a process is assigned according to the sort of the process such as Operating System (OS) kernel, application, and so forth. One of the processors P having the lowest process execution priority survives. Since it is possible that two or more processors whose processes have the same priority, the second arbitration is carried out by using a round robin method. The round robin is a method that gives each arbiter a peculiar priority, which is rotated by the arbiter every time when arbitration is carried out, and selects a processor having the highest priority. Evenness in arbitration is always maintained by this rotation. Through the two step arbitration, the interrupt arbiters 3 determine a sole processor P to accept the I/O interrupt, and apply an interrupt signal to the processor P.

Figure 2:
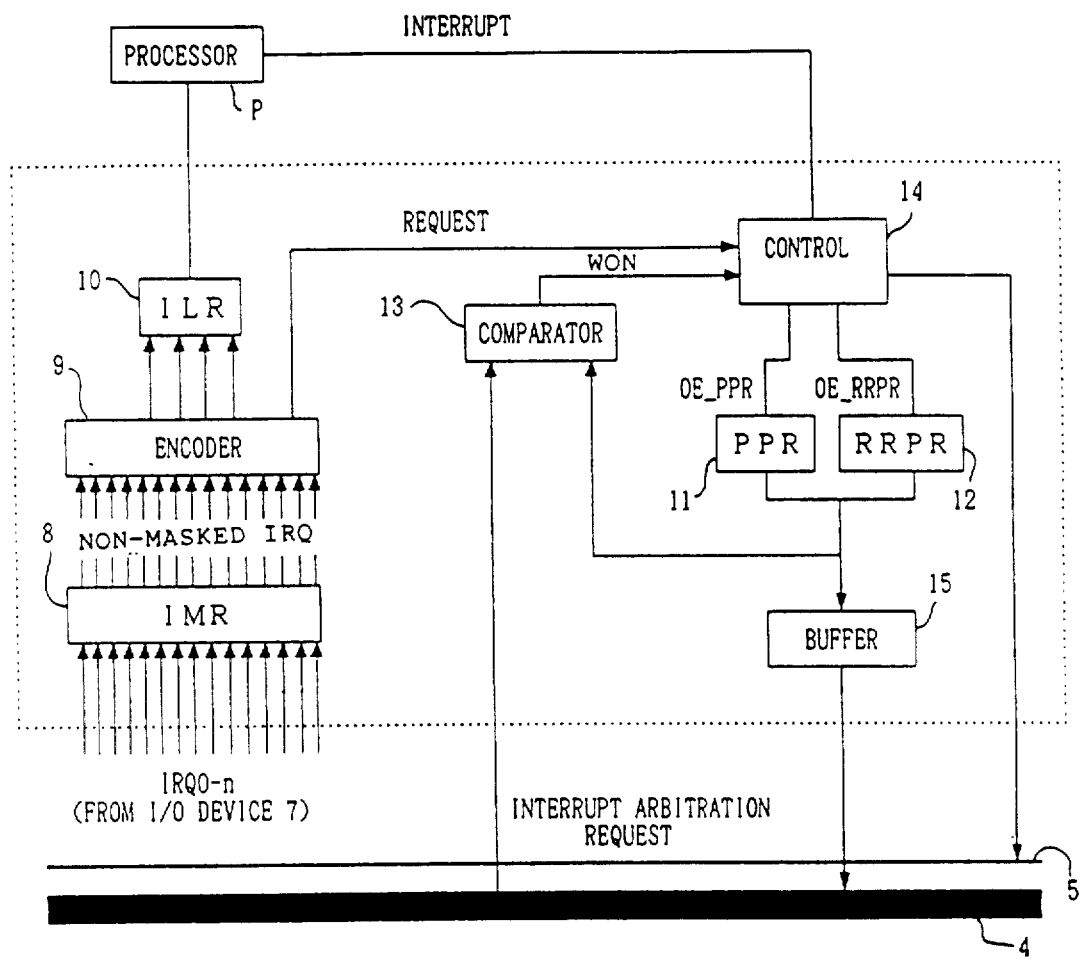
FIG. 2 is a block diagram showing an arrangement of an interrupt arbiter in the embodiment of FIG. 1.

FIG. 2 shows an example in realizing the interrupt arbiter. In FIG. 2, the interrupt arbiter 3 is made of an interrupt mask register (IMR) 8, an encoder 9, an interrupt level register (ILR) 10, a process priority register (PPR) 11, a round robin priority register (RRPR) 12, a comparator 13, a control logic 14, and others.

Among them, the IMR 8, encoder 9, and ILR 10 are functions given by a conventional interrupt controller. The IMR 8 designates an interrupt request level to be masked. Encoder 9 is a combination logic which selects one interrupt request level (IRQ) having the highest priority among interrupt request levels (IRQ) having passed through the IMR 8, that is, interrupt request levels that have not been masked (non-masked IRQ). The ILR 10 is a register which returns the interrupt request level selected by the encoder 9 to the processor that acknowledged the interrupt.

Therefore, all constituent elements additionally required for realizing the invention are: two registers, the PPR 11 and the RRPR 12; the comparator 13, and the control logic 14 therefor. Data from the PPR 11 and the RRPR 12 are stored in a buffer 15 for a moment. PPR 11 designates the I/O interrupt priority corresponding to the process execution priority (the higher the process execution priority, the lower is the I/O interrupt priority), and the designated priority is used for first arbitration based on the process execution priority. The RRPR 12 of each interrupt arbiter 3 is a counter which counts cyclically within the range of the number of the processors. The count is initialized to its peculiar original priority upon start of the system, and has a value different from those of the RRPRs 12 of other interrupt arbiters. The counter counts interrupt arbitration operations, that is, interrupt arbitration pulses (see FIG. 3 where the pulse is HIGH when an interrupt arbitration request signal is LOW and the BUS Busy is HIGH), and the content is rotated every time when interrupt arbitration is carried out. Specifically, priority 0 is changed into 1, priority 1 into 2, priority 3 into 4, ..., and priority (N−1) (N is the number of processors) into 0. Alternatively, priority (N−1) is changed into (N−2), priority (N−2) into (N−3), ..., and priority 0 into (N−1). The content of RRPR 12 is used for second arbitration by the round robin method. When the selected interrupt request level changes, the encoder 9 sends a request signal to the control logic 14. The control logic 14 is activated by the request signal. The circuit 14 pulls down the interrupt arbitration request line 5 to LOW, and prohibits the use of the arbitration line 4 by the bus arbiter 2 for a moment. When a preceding memory bus cycle ends, the content of the PPR 11 is sent on the arbitration line 4 by an OE_PPR (Output Enable PPR) signal in order to operate the first interrupt arbitration based on the process execution priority. When the processor wins the first arbitration, it sends the content of the RRPR 12 to the arbitration line 4 by the OE_RRPR (Output Enable RRPR) signal in order to perform the second arbitration by the round robin method to be done. In the first interrupt arbitration, the comparator 13 compares the content of the PPR 11 with priorities of other interrupt arbiters 3 sent on the arbitration line 4. When its own process execution priority is the lowest, it sends an acquisition signal to the control logic to notify that it has won the first arbitration. In the second arbitration, the comparator 13 compares the content of the RRPR 12 with other priorities. When the priority of its own RRPR 12 is the highest, it sends an acquisition signal to the control logic 14 to notify that it has been selected by the second arbitration. The control logic 14 responsively sends an interrupt signal to the processor to interrupt it.

FIG. 3 shows a timing chart of interrupt arbitration by the interrupt arbiter 3. In this example, let the shared bus 1 be in clock synchronization. An interrupt request (i), in this FIGURE, denotes the (i)th interrupt request line among interrupt request lines of 1 to n levels. A bus busy signal is an active-low tristate or wired-OR signal in which the shared bus 1 is involved in a memory cycle when this signal is LOW. Therefore, arbitration of requests for the use of the bus 1 or for an interrupt is done when the bus busy signal is HIGH. The interrupt signal is used by each interrupt arbiter 3 to notify its processor P of an interrupt. The interrupt signal shown in FIG. 3 appears within only one interrupt arbiter 3 selected by interrupt arbitration. An example of interrupt arbitration procedure of FIG. 3 is explained below.

(1) During clock 1, an I/O device pulls up an interrupt request (i) signal and issues an interrupt request. In each interrupt arbiter 3, unless the interrupt request (i) signal is masked by the IMR 8, the encoder 9 reselects an interrupt request whose level is the highest. When the value of the encoder 9 is changed, a request signal is sent to the control logic 14.

(2) In the bus clock 2, the control logic 14 of the interrupt arbiter 3 is activated and sends an interrupt arbitration request signal onto the shared bus 1. Then the next arbitration cycle is rendered effective only for interrupt arbitration. Therefore, when the interrupt arbitration request signal becomes LOW, the bus arbiter 2 withholds entry of the next arbitration cycle.

(3) In the bus clock 3, the bus busy signal becomes HIGH, the memory bus cycle ends, and the arbitration cycle takes place. Since the interrupt arbitration request signal is LOW, the bus arbiter 2 cannot execute arbitration of bus requests. In this cycle, one or more interrupt arbiters 3 participate in the interrupt arbitration. The interrupt arbitration is done in two cycles. In the bus clock 3, the interrupt arbiters 3 issue values of PPRs 11 onto the arbitration line 4 and perform interrupt arbitration on the basis of priorities of processes currently executed by the respective processors P. One or more interrupt arbiters 3 having the lowest process execution priority win the arbitration.

(4) In the bus clock 4, the interrupt arbiters 3 that have the lowest process execution priority issue values of RRPRs 12 onto the arbitration line 4 and perform arbitration on the basis of the round robin. A sole interrupt arbiter 3 whose RRPR 12 has the highest content is selected.

(5) In the bus clock 5, the selected interrupt arbiter 3 interrupts the processor P by means of an interrupt signal. The interrupted processor P can know the level of the accepted interrupt by reading the ILR 10. Each interrupt arbiter 3 that has participated in the interrupt arbitration pulls up its interrupt arbitration request signals to HIGH to permit the bus arbiter 2 to use the arbitration line 4. The bus arbiter 2 can perform arbitration of usual bus requests other than interrupt requests in the bus clock 5.

(6) In the bus clock 6, one of the processors P that has won the arbitration of bus requests pulls down the bus busy signal to LOW and starts the memory bus cycle.

It is preferable that interrupts from I/O devices be equally sent to processors that currently execute low-priority processes. This embodiment selects one or more processors P that are executing low-priority processes by using values of PPRs 11 which can be set through software. Even when two or more processors P have the lowest execution priority, instead of selecting fixed one of the processors P, the system selects one of the processors P equally by means of arbitration by the round robin. Therefore, load distribution in I/O processing is fully attained.

Interrupt arbitration by this embodiment is carried out by using a usual system bus arbitration cycle. Each interrupt arbiter 3 performs arbitration on the basis of the process execution priority in this cycle, and further uses another cycle to perform arbitration by the round robin. Therefore, an interrupt can be arbitrated and distributed in a time twice longer than the usual bus arbitration time at maximum. Even when interrupts of various levels occur concurrently, the interrupts can be distributed to the processors P in a short time.

If one processor alone executes OS kernel whereas the other processors execute a user's process, or if various I/O device handler and servers are peculiar to particular processors P, then it is desirable that interrupts of a each level be transmitted to a particular processor. In addition, if all processors P are expected to execute OS kernel, or if respective processor groups have different servers, then it is desirable that an interrupt of a each level be transmitted to a particular processor group. The invention can dynamically replace the processors or groups of processors which accept interrupts for each level according to the load conditions of the system by changing the IMR 8. That is, the invention can specifically designate a group of processors for each interrupt level.

This embodiment can be easily realized simply by equipping each processor P with the interrupt arbiter 3 since the logic amount of the interrupt arbiter 3 is small. In addition, since the control logic need not be added to the I/O device, controller, and so on, existing I/O cards can be used. Since the transmission line required for interrupt arbitration shares the system bus arbitration line, no substantial change in the back plane is necessary. Therefore, this embodiment is readily available to existing multiprocessor systems by slightly changing and adding hardware.

This invention is not limited to the details of the foregoing embodiment, and envisages various modifications without departing from the scope thereof.

What is claimed is:

1. A multiprocessor system comprising:
    a plurality of processors;
    an arbitration bus; arbitration means provided for each of the processors and coupled to the arbitration bus for determining which of the processors is to handle a pending interrupt signalled in the system, and the interrupt arbitration means including:
    first level interrupt priority storing means for indicating a first level priority storing means for indicating a first level priority for each processor which is dynamically signalled to the interrupt arbitration means by software executing in the system to represent as a first level priority for each processor the respective software priority for associated software executing on each processor, more than one processor capable of having the same first level priority at the time of any interrupt;
    second level interrupt priority storing means for indicating a second level priority for each processor which is dynamically signalled to the interrupt arbitration means by shifting a set of different second level priorities among the processors each time an interrupt is handled by any processor, the second level priority being different for each processor;

interrupt detecting means in the interrupt arbitration means for detecting when more than one processor indicates acceptability for handling the interrupt and indicate the same first level priority; and interrupt assigning means for assigning the handling of the interrupt to one of the processors currently indicating acceptability and the highest second level priority.

* * * * *